United States Patent
Spiegel et al.

(10) Patent No.: US 6,571,326 B2
(45) Date of Patent: May 27, 2003

(54) SPACE ALLOCATION FOR DATA IN A NONVOLATILE MEMORY

(75) Inventors: Christopher J. Spiegel, El Dorado Hills, CA (US); Christopher M. McAllen, Sacramento, CA (US)

(73) Assignee: Intel Corporation, Santa Clara, CA (US)

(*) Notice: Subject to any disclaimer, the term of this patent is extended or adjusted under 35 U.S.C. 154(b) by 79 days.

(21) Appl. No.: 09/801,585

(22) Filed: Mar. 8, 2001

(65) Prior Publication Data

US 2002/0129192 A1 Sep. 12, 2002

(51) Int. Cl.[7] .............................................. G06F 12/02
(52) U.S. Cl. ..................... 711/170; 711/171; 711/172; 711/173; 714/25; 714/718
(58) Field of Search .................. 711/103, 170–173; 714/718, 25

(56) References Cited

U.S. PATENT DOCUMENTS

| | | | |
|---|---|---|---|
| 5,406,529 A | 4/1995 | Asano ..................... 365/230.03 |
| 5,420,999 A | 5/1995 | Mundy ........................ 711/173 |
| 5,469,390 A | 11/1995 | Sasaki et al. ................ 365/200 |
| 5,682,497 A | 10/1997 | Robinson ..................... 711/103 |
| 5,737,742 A | 4/1998 | Achiwa et al. .............. 711/103 |
| 5,822,781 A | * 10/1998 | Wells et al. ................... 703/23 |
| 5,847,995 A | 12/1998 | Kobayashi et al. ..... 365/185.18 |
| 5,860,124 A | 1/1999 | Matthews et al. ........... 711/165 |
| 6,000,005 A | * 12/1999 | Yamada ................. 365/185.33 |
| 6,226,728 B1 | * 5/2001 | See et al. .................... 711/103 |

OTHER PUBLICATIONS

Deborah L. See, et al., U.S. patent application entitled "Dynamic Allocation for Efficient Management of Variable Sized Data Within A Nonvolatile Memory", filed Apr. 21, 1998, 38 pgs. 20 pgs./figures.

Mei–Ling Chiang; Lee, P.C.H.; Ruei–Chuan Chang, "Managing Flash Memory in Personal Communication Devices", Proceedings of 1997 IEEE International Symposium, 1997, pp: 177–182.

INTEL® FLASH DATA INTEGRATOR (FDI) USER'S GUIDE, Version 3.0, Aug. 2000, 228 pages.

* cited by examiner

Primary Examiner—T. V. Nguyen
(74) Attorney, Agent, or Firm—Blakely, Sokoloff, Taylor & Zafman LLP (57) ABSTRACT

The present invention comprises a method, apparatus, and machine-readable medium to pre-allocate a space for data. Embodiments of the present invention are designed to pre-allocate a space for data in nonvolatile memory. More specifically, embodiments may provide a reservation for a data write, so sufficient unallocated space can be confirmed as available for the write prior to actually writing the data to the nonvolatile memory.

27 Claims, 5 Drawing Sheets

SPACE ALLOCATION FOR DATA IN A NONVOLATILE MEMORY

FIELD OF THE INVENTION

The present invention is in the field of storing data to nonvolatile memory. In particular, the present invention comprises a method, apparatus, system, and machine-readable medium to pre-allocate a space for data.

BACKGROUND OF THE INVENTION

Many devices today have data storage, such as cell phone, personal digital systems and computers. Data storage is typically divided into two categories, volatile data storage and nonvolatile data storage. Volatile data storage, such as random access memory (RAM) has the advantage of a fast access time. However, power is necessary to maintain data in volatile memory. Nonvolatile data storage, such as flash memory, does not require power to maintain the data. Nonvolatile memory, on the other hand, often has the disadvantage of a slower access time, particularly when writing data to or erasing data from the nonvolatile memory. For example, flash memory may take several cycles to write data. In a flash memory device, data can be maintained by storing a charge on a capacitance in a transistor via hot electron injection. The amount of charge on the capacitance in the transistor determines the data stored in that transistor. To store new data in a transistor in flash memory, the algorithms within the flash memory device must first erase the transistor by reducing the charge to a minimum threshold charge. The minimum threshold charge may represent the logical bits "11", for instance. If logical bits "11" do not represent the data to be written into the transistor then an additional 100 cycles or more may be required to write the data. Unlike flash memory, the time involved with programming data into RAM may be based on the slew rate of changing the state of a transistor or a series of transistors. Changing the voltage or current supply to the base or gate of the transistor can change the transistor state.

As a result of the differences between nonvolatile memory and volatile memory, one may be more suitable than the other for a particular application. A cell phone, for example, may use both volatile memory and nonvolatile memory. Specifically, a cell phone will allow a user to store a phone number. If the phone number were stored in volatile memory, the number would be lost when the voltage or current of the battery is insufficient to maintain a transistor state or when the battery is replaced. Since it is more useful to the user to retain the number when the battery charge runs out or when the battery is replaced, phone numbers are typically stored in nonvolatile memory. However, it is undesirable to make a user wait over two hundred cycles for each digit the user enters for a phone number. Therefore, volatile memory may be used as a buffer to hold the telephone number while it is being stored in nonvolatile memory, allowing the user to enter the phone number quickly and use the phone for other purposes while the phone number is being stored.

Data may be organized in blocks to reduce hardware complexity and silicon cost, such as in flash memories. Within each block, data may be organized in a data structure that may comprise, for example, a section for block information, a section for header information, a section for unallocated space, and a section for data. The block information may comprise, for example, an offset indicating the end of the block. The header section can comprise one or more headers starting immediately after block information section. A header, also called a unit header, can be a data structure within the memory to describe a unit, e.g. one or more granules of memory for data. A granule may comprise a fixed size, movable data block and can be the smallest amount of memory manipulated by a memory manager. Generally, the space represented by a granule varies with the application for the memory. The header can comprise a fixed location data pointer and may include an offset indicating the start and an offset indicating the end of data associated with the header as well as a reference indicating ownership of the data by a file or directory. Further, a sequence of bits may indicate the boundary between the header section and the unallocated space section to allow the number of headers in the header section to vary. The sequence of bits may be immediately between the header section and the unallocated space section or may comprise a bit in each header.

The organization of data in blocks with headers has the advantage of saving significant amounts of time when erasing data. To erase data, a valid bit in each header can be modified to indicate that the data associated with that header is no longer valid. In this way, changing a single bit can effectively erase any amount of data. On the other hand, this process may leave invalid data between two units of valid data in a block, fragmenting the unallocated space. Thus, upon a request to store a large unit of data, the blocks may only have small units of free or dirty space. Free space is an area of memory that has been erased and is ready to be written to, whereas dirty space is an area of memory containing invalid data. So when writing the large block of data to the data storage device, the data can either be broken up into several small units (an area of memory of one or more granular sizes) or the small units may be consolidated into a single large contiguous unit of unallocated space. In many cases, it is more efficient for the memory device to consolidate the memory in a process called reclaiming memory. Reclaiming memory is a process of erasing dirty space, generally a block at a time, and may entail moving valid units of data to another block then moving them back in a substantially consecutive sequence. For example, each time a write is requested, an algorithm may check to see if sufficient free space is available to write the data. When insufficient free space is available, a procedure to reclaim memory may initiate. The reclamation process can reclaim as much memory as necessary or as possible in a contiguous unit. When the space is still insufficient, the write command may fail, resulting in a significant amount of wasted time by the agent waiting to see if the write can be performed.

Undoing and redoing the data write can compound that wasted time. For example, when a write is requested, the largest contiguous free space is typically chosen for storing the data to increase the efficiency of writing. As a result, a small unit of data may be written into a large unit of free space. The next write in sequence, however, may comprise a unit of data that is too large for any remaining unallocated space but can fit in the free space just used for the smaller unit of data. Now the smaller unit of data is moved into a smaller unit of free space, the large unit of space is reclaimed, and the larger unit of data is stored in the reclaimed space. This problem can compound even more when several smaller units of data are written into one or more larger units of unallocated space prior to writing a larger unit of data.

BRIEF FIG. DESCRIPTIONS

The accompanying drawings, in which like references indicate similar elements, show.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
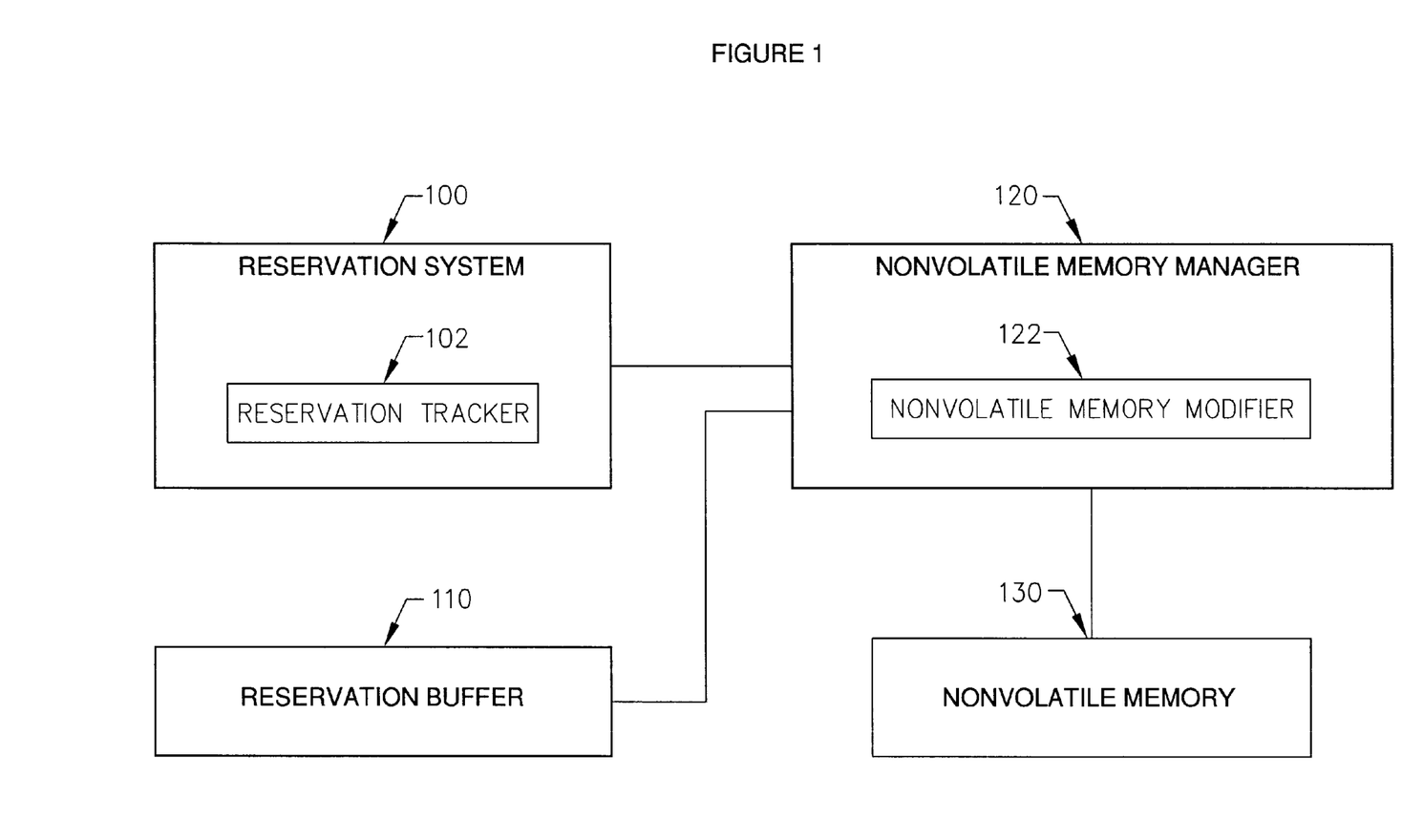
FIGS. 1–2 depict example apparatus embodiments of the present invention.

Referring to FIG. 1, an example embodiment to pre-allocate a space for data is shown. In this embodiment of the invention, reservation system 100 is coupled to a nonvolatile memory manager 120. The nonvolatile memory manager 120 is coupled to a reservation buffer 110 and to a nonvolatile memory 130. In the present embodiment, the reservation system 100 is designed to determine how much unallocated space is available in the nonvolatile memory 130 via the nonvolatile memory manager 120 and to reserve unallocated space for requested data writes. The reservation system 100 comprises a reservation tracker 102. The reservation tracker 102 can track the amount of unallocated space available in the nonvolatile memory 130 and can track the amount of reserved space for requested data writes to the nonvolatile memory 130. Upon receiving a request to store data in the nonvolatile memory 130, the nonvolatile memory manager 120 requests a space reservation from the reservation system 100. The reservation system 100 determines whether unallocated space is available for the write via the reservation tracker 102. The reservation system 100 then responds to the nonvolatile memory manager 120 with a reference to a reservation for the data or with an indication that the unallocated space is insufficient for the data write to the nonvolatile memory 130. Upon receiving the reservation reference from the reservation system 100, the nonvolatile memory manager 120 may store the reservation reference and the data in the reservation buffer 110 and can also provide a confirmation for the data write to the agent that requested the data write, such as a media management system or a software application. In some embodiments, a second confirmation may be transmitted to the agent when the write to the nonvolatile memory 130 is completed. The nonvolatile memory manager 120, in the present embodiment, comprises a nonvolatile memory modifier 122. The nonvolatile memory modifier 122 is designed to perform the data writes stored in the reservation buffer 110 as background operation. For example, the nonvolatile memory manager 120 may receive requests for data writes to or requests for reads from the nonvolatile memory 130. When the nonvolatile memory manager 120 is not receiving requests for reads or writes, the nonvolatile memory modifier 122 may perform the writes stored in the reservation buffer 110.

Alternative embodiments comprise a reservation system 100 coupled to a buffer such as reservation buffer 110 to allow the reservation system 100 to track reservations for data writes. In some of these embodiments, the reservation system 100 tracks a logical block of the reserved unallocated space for a data write. A logical block is a representation of the contents of a physical block in the nonvolatile memory 130. Logical blocks may be stored in a logical block table. Further embodiments comprise a system for tracking the amount of the unallocated space in the nonvolatile memory 130 that is dirty space. In some of these embodiments, the dirty space is associated with a logical block. Upon associating unallocated space with a logical block, the logical block may be associated with a physical block in the nonvolatile memory 130. Even though a reservation reference can associate a data write to a physical block, the data may not be written to that physical block. The data may be written to another physical block due to efficiency considerations, such as whether the unallocated space within a block entails reclamation prior to the data write. In addition, it is typically more efficient to write to a larger unallocated space than to a small, unallocated space in some configurations of nonvolatile memory.

Figure 2:
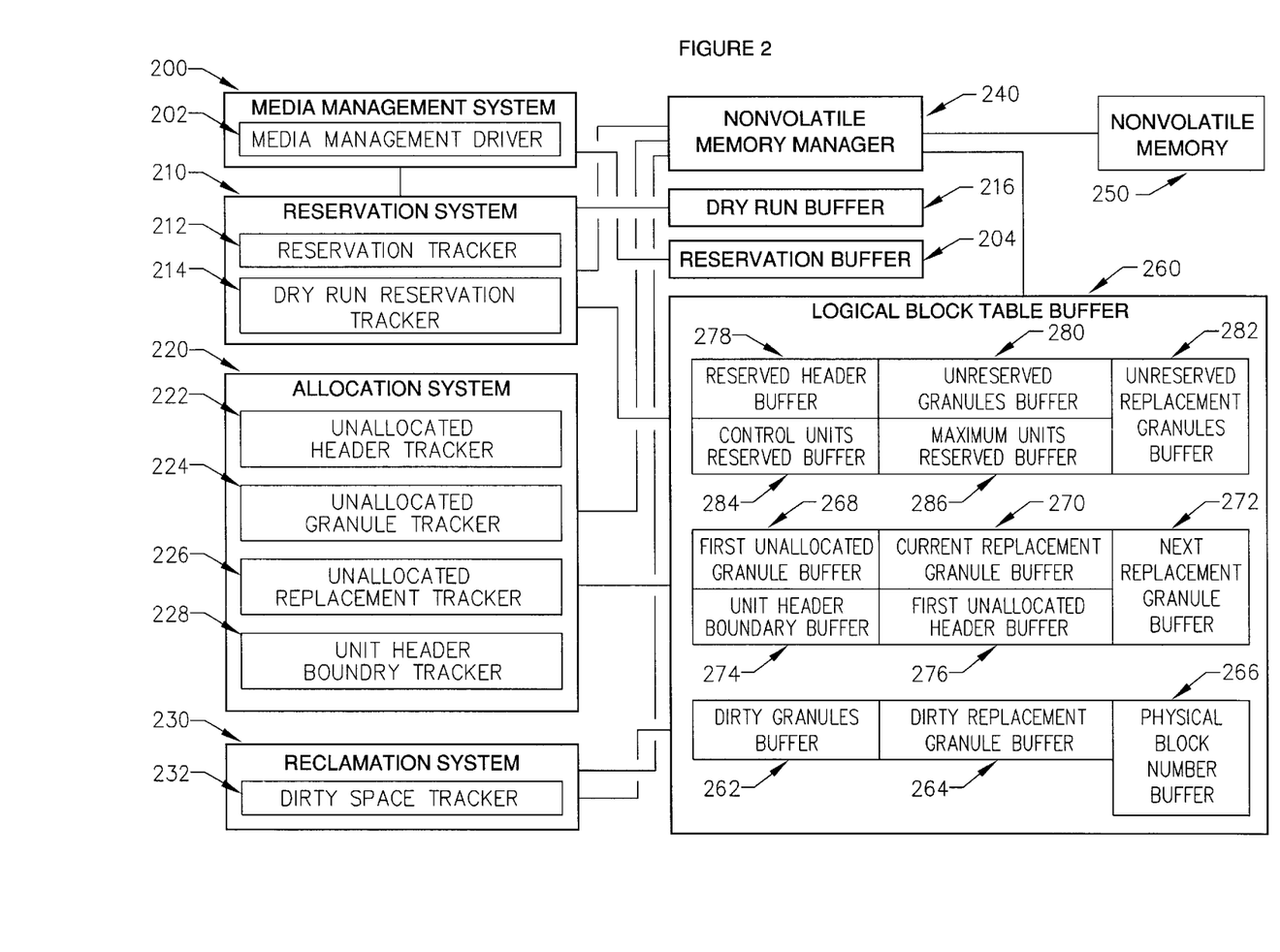

Turning now to FIG. 2, there is shown an example system to pre-allocate a space for data. The media management system 200 comprises a media management driver 202 to perform actions upon nonvolatile memory 250 via the reservation system 210 and the nonvolatile memory manager 240. Upon receiving a request to read data from the nonvolatile memory 250, the media management driver 202 can request the read from the nonvolatile memory manager 240. On the other hand, when the request is for a data write to the nonvolatile memory 250, the media manager driver 202 may transmit a request for the write to the reservation system 210. The reservation system 210 is coupled to a logical block table buffer 260 to store and retrieve information about the nonvolatile memory 250. When sufficient unallocated space in the nonvolatile memory 250 is available for the write, the reservation system 210 returns a reservation reference to the media management system 200. The media management system 200 then stores the data to be written along with a reservation reference in the reservation buffer 204. If the reservation system 210 cannot reserve an unallocated space for the write, the reservation system 210 may return a write failure to the media management system 200.

Referring still to FIG. 2, the reservation system 210 is designed to receive a write request from the media management system 200, locate unallocated space within the nonvolatile memory 250 via the nonvolatile memory manager 240, and store references to reserved and unreserved unallocated space in the logical block table buffer 260. The reservation system 210, in the present embodiment, comprises a reservation tracker 212 and a dry run reservation tracker 214. When the nonvolatile memory manager 240 and the nonvolatile memory 250 are first powered up, the reservation tracker 212 will determine the amount of unallocated space. Further, in the present embodiment, the logical block table buffer 260 is stored in RAM so if power is lost to the logical block table buffer 260, any information stored in the logical block table buffer 260 such as reservations for data writes will be lost, invalidating any reservations for data stored in reservation buffer 204 and requiring the reservation tracker 212 to determine the amount of unallocated space in the nonvolatile memory 250. When previously reserved data is still present in the reservation buffer 204, the reservation tracker 212 may determine a new reservation for the data and the media management system 200 can store the new reservation in the reservation buffer 204. The dry run reservation tracker 214 is designed to copy contents of the logical block table buffer 260 into a dry run buffer 216 and determine whether modifications to prior reservations can allow additional data to be stored in the nonvolatile memory 250. For example, these logical blocks as described in the logical block table buffer 260 may have unallocated space that is so fragmented by the reservations that a sufficiently large unallocated space is not available for a data write. Dry run reservation tracker 214 may copy the logical block table buffer 260 into the dry run buffer 216 and modify prior reservations for data writes and valid data units to consolidate unallocated space and to determine if a sufficiently large unallocated space can be made available for the write request. Upon failing to free a sufficiently large unallocated space, the copy of the logical block table buffer 260 in the dry run buffer 216 can be discarded and a new copy of the logical block table buffer 260 can be placed in the dry run buffer 216. Thus, modifications to blocks can be attempted without having to undo the failed attempts. If an arrangement is found that allows the data write to be reserved, the reservation system 210 can acknowledge the reservation to the media management system 200 and copy contents of the dry run buffer 216 or the modified portions thereof, into the logical block table buffer 260. Then, when the nonvolatile memory manager 240 is available for a background operation, the reservation system 210 can retrieve data and its corresponding reservation reference from reservation buffer 204 to execute the data write. Regardless of the logical block associated with the reservation for the data, the reservation system 210 can determine the most efficient unallocated space in the nonvolatile memory 250 to place the data. For example, the reserved space for the data may be dirty space so the reservation system 210 can locate an unallocated space that is free space. In some embodiments, the dry run reservation tracker 214 may rearrange data and reservations locate sufficient unallocated free space in the nonvolatile memory 250 for the data retrieved from the reservation buffer 204.

In the present embodiment, the reservation tracker 212 stores the number of reserved headers for each logical block in a reserved header buffer 278 in the logical block table buffer 260. The contents of the reserved header buffer 278 can allow the reservation tracker 212 to keep track of the number of headers within a logical block that have been reserved. The reservation tracker 212 also tracks unreserved granules in the unreserved granules buffer 280 and unreserved replacement granules and the unreserved replacement granules buffer 282 of the logical block table buffer 260. A granule is the smallest amount of memory manipulated by the nonvolatile memory manager and can vary depending upon the application for the nonvolatile memory. The number of granular units reserved in a logical block is dependent on two different sizes chosen for a particular application of the logical block table buffer 260. A minimum number of granular units that can be reserved in a logical buffer is stored in the control units reserved buffer 284 and the maximum number of granular units that can be stored in a contiguous data unit in a logical block is in the maximum units reserved buffer 286. For example, a data write request from the media management system 200 may need 12 granules of a logical block. The reservation system 210 can start at the first logical block of the nonvolatile memory 250 and the first logical block comprises 10 granules of unallocated space. Comparing the 12 granules to the 15 granules of the control units reserved buffer 284 may restrict reservations for this data write to a single data unit in a logical block. Therefore, the reservation system 210 does not reserve any granules in the first logical block. The reservation system 210 then moves to the second logical block finding 100 unallocated granules and can reserve those 12 granules for the data write because it can be reserved in a single data unit as indicated by the contents of the control units reserved buffer 284 and it is less than or equal to the maximum number of granular units that can be reserved in a logical block in accordance with the maximum units reserved buffer 286. The control units reserved may be chosen for efficiency purposes as the minimum number of granules to be reserved or written to in a block before the data write will be split into data fragments, i.e. write the data in more than one block. The maximum units reserved may be chosen to limit the maximum contiguous granular space used for a data write and is also chosen for data handling efficiency. Each logical block may be checked to determine whether a sufficient number of granules are available to reserve for the data write. In some embodiments, all the logical blocks are reviewed to determine the largest unallocated space. In other embodiments, the blocks are reviewed in sequential order until a sufficient size unallocated space is found.

The allocation system 220 can provide information regarding unallocated headers, unallocated granules, and unallocated replacement granules and the unit header boundary. The unit header boundary describes the boundary between the header section and the unallocated space section of each logical block. The allocation system 220 is coupled to the logical block table buffer 260 to store the information regarding headers, granules, replacement granules, and the unit header boundary, in the present embodiment. The allocation system 220 comprises an unallocated header tracker 222 designed to track the first unallocated header in each logical block and store a reference to the location of that first unallocated header in the logical block table buffer 260 at the first unallocated header buffer 276. The allocation system 220 can comprise an unallocated granule tracker 224 to determine the first unallocated granule in each logical block and to store a reference to the first unallocated granule in the logical block table buffer 260 at the first unallocated granule buffer 268. Replacement granules may comprise one or more granules within the data section of a block of nonvolatile memory 250 to allow appending to or rewriting data and may be tracked by a header allocated for replacement granules. The number of replacement granules may be determined as a percentage of the number of granules in a data unit or may be a fixed number per data unit. When replacement granules are in each physical block, the allocation system 220 can provide an unallocated replacement tracker 226 to track the location of the current replacement granule and store it in a current replacement granule buffer 270. In some of these embodiments, the next replacement granule is also stored in the logical block table buffer 260 at next replacement granule buffer 272. Further, a unit header boundary tracker 228 of the allocation system 220 can track the unit header boundary and store the unit header boundary in the unit header boundary buffer 274 within the logical block table buffer 260. With the information gathered by the allocation system 220, the reservation system 210 can determine the number of unallocated granules present in each logical block by reading the contents of the unit header boundary buffer 274 and the contents of the first unallocated granule buffer 268 and jump directly to the current replacement granule to determine the number of unreserved replacement granules in each block, such as by reading the contents of the first unallocated header buffer 276. In addition, the contents of the first unallocated header buffer 276 can remove a search for an unallocated header before each data write.

Referring still to FIG. 2, the reclamation system 230 is designed to track dirty granules with the dirty granules buffer 262, dirty replacement granules in the dirty replacement granule buffer 264, and physical block number of the dirty granules and dirty replacement granules in the physical block number buffer 266. The reclamation system 230 comprises a dirty space tracker 232 to search through the nonvolatile memory 250 via the nonvolatile memory manager 240 for the dirty granules, dirty replacement granules, and physical block numbers. By comparing the location of dirty space within each block of the nonvolatile memory to the reservation for data writes, the reservation system 210 can determine whether it is efficient to store the data in the physical block corresponding to its reservation or to write the data to a different block. For example, if the reserved unallocated space is in a dirty block and the dirty block is substantially full with valid data, then it may be inefficient for the reservation system to copy the valid data out into a buffer, reclaim the block, rewrite the data from the buffer to the space, and then write the data from the reservation buffer 204 to that unallocated space.

Figure 3:
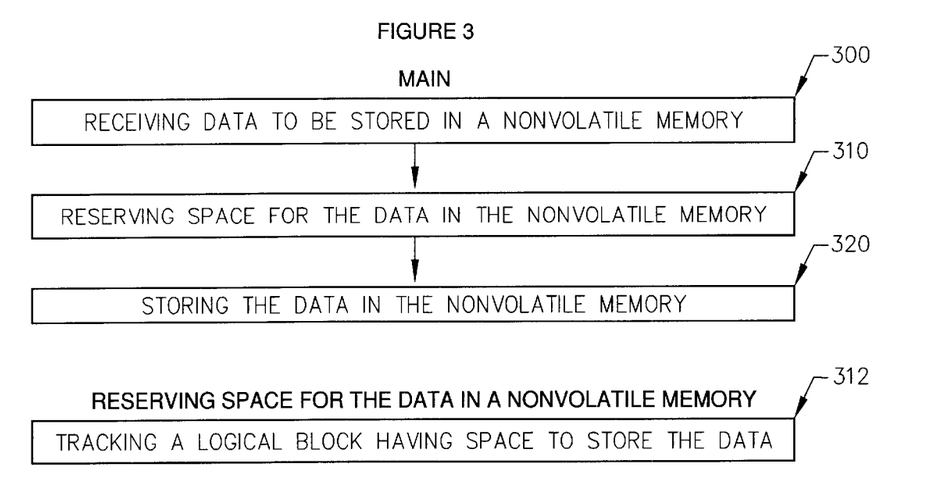
FIG. 3 depicts a flow chart of embodiments of the present invention.

Referring now to FIG. 3, there is shown an example flow chart of embodiments to pre-allocate a space for data. The flow chart comprises receiving data to be stored in a nonvolatile memory 300, reserving space for the data in the nonvolatile memory 310, and storing the data in the nonvolatile memory 320. Receiving data to be stored in a nonvolatile memory 300 can comprise receiving data linked to a file or directory of an existing data structure in the nonvolatile memory or can comprise appending to or replacing data already stored in the nonvolatile memory. In some embodiments, receiving data to be stored in a nonvolatile memory 300 can comprise receiving a description of data to be stored in the nonvolatile memory. The description can comprise the amount of data to be stored, a data structure in which to store the data, and/or a file or directory in which to store the data. Reserving space for the data in the nonvolatile memory 310 is designed to determine whether sufficient unallocated space to reserve the data is available in the nonvolatile memory, to provide a reference to associate the reserved space with the data, and to track the reserved space for the data so that the reserved space can be maintained until the data is stored in the nonvolatile memory. For example, a software application may need to append data to an existing file in the nonvolatile memory. The software application can instruct a media management system to append three bytes of data to a particular data fragment. Reserving space for the data in the nonvolatile memory 310 can then determine whether a sufficient number of replacement granules is available in the block of the data fragment to store the appended data. If a sufficient number of replacement granules is available, reserving space for the data in the nonvolatile memory 310 can return a reference identifying the reserved space to the media management system and track the number of reserved replacement granules to store the three bytes of data, maintaining that number of reserved replacement granules in the block. In some embodiments, when insufficient replacement granules are available, reserving space for the data in the nonvolatile memory 310 can change a prior reservation to increase the number of unallocated replacement granules sufficiently to store the three bytes of data.

Reserving space for the data in the nonvolatile memory 310, in the present embodiments, can comprise tracking a logical block having space to store the data 312. Tracking a logical block having space to store the data 312 is designed to facilitate maintenance of the reserved space and may comprise maintaining associations between reserved space and a logical block. For example, when a request is received from a media management system to store data in nonvolatile memory, tracking a logical block having space to store the data 312 can comprise incrementing the number of reserved headers in a reserved header buffer for a logical block and decreasing the number of unreserved granules or unreserved replacement granules in that logical block. Storing the data in the nonvolatile memory 320 is designed to determine a location to store the data in the nonvolatile memory, store the data, and remove the reservation from the reservation tracking system. Storing the data in the nonvolatile memory 320 can comprise determining where the largest block of unallocated space in the nonvolatile memory is located.

In some embodiments, storing the data in the nonvolatile memory 320 may comprise selecting a logical block having sufficient free space to store the data, selecting a block having sufficient dirty space to store the data, or selecting a block to evenly distribute life cycles in the nonvolatile memory. Selecting a logical block having dirty space may entail moving data out of the logical block to another logical block and/or reclaiming the block. Selecting the logical block to increase the life cycles of the nonvolatile data may, for example, entail tracking the number of erases and writes from units of nonvolatile memory and tracking those units of nonvolatile memory to physical blocks.

Figure 4:
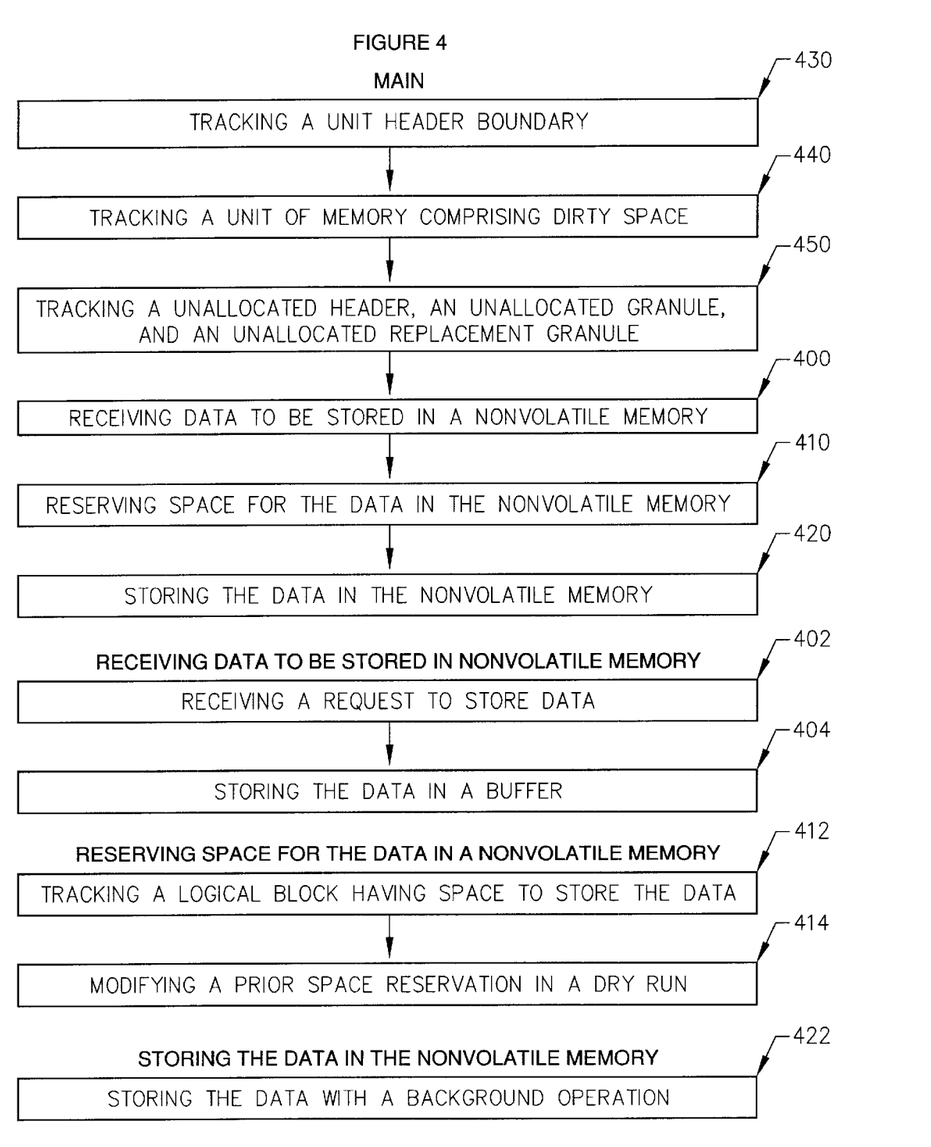
FIG. 4 depicts an alternative flow chart of embodiments of the present invention.

Referring now to FIG. 4, an example flow chart of embodiments to pre-allocate a space for data is shown. The flow chart comprises receiving data to be stored in a nonvolatile memory 400; reserving space for the data in the nonvolatile memory 410; storing the data in the nonvolatile memory 420; tracking a unit header boundary 430; tracking a unit of memory comprising dirty space 440; and tracking an unallocated header, an unallocated granule, and an unallocated replacement granule 450. Receiving data to be stored in a nonvolatile memory 400 can comprise receiving a request to store data 402 and storing the data in a buffer 404. Receiving a request to store data 402 can be designed to receive data as well as an instruction regarding how to store the data. In some embodiments, the instruction may include a file and directory identifier. For example, a software application may request that a file be replaced with a new file. The media management system can break down the replacement into instructions for the nonvolatile memory manager to replace data at a location with alternate data. Storing the data in a buffer 404 can preserve the data and request in a buffer for processing by a reservation system. Reserving space for the data in the nonvolatile memory 410 can comprise responding with a write failure when insufficient space is available for the data to be stored in the nonvolatile memory or responding with a reservation reference to indicate that the write can be made to the nonvolatile memory and where the write may store the data. Thus, unallocated space can be maintained for the write and marked as unavailable space for subsequent reservations and writes.

In the present embodiments, reserving space for the data in the nonvolatile memory 410 may comprise tracking a logical block having space to store the data 412 and modifying a prior space reservation in a dry run 414. Tracking a logical block having space to store the data 412 can be implemented to associate available and reserved space with logical blocks. Logical blocks describe the contents of a physical block. Modifying a prior space reservation in a dry run 414 may use techniques such as this to rearrange data to consolidate available space in a block for a write request.

Modifying a prior space reservation in a dry run 414 can allow multiple rearrangements of the contents of physical blocks to be tested without changing the contents of the physical block or the associated logical blocks.

Referring still to FIG. 4, a detailed example flow chart of embodiments of storing the data in the nonvolatile memory 420 is shown. Storing the data in the nonvolatile memory 420 can facilitate the storage of data into a physical block within the nonvolatile memory. Although reserving space for the data in the nonvolatile memory 410 may make a reservation for the data that can be associated with a physical block, the reserved space may not be the most efficient location to store the data so storing the data in the nonvolatile memory 420 can comprise locating an efficient space to store the data. Locating an efficient space to store the data may also entail rearranging reservations, as in modifying a prior space reservation in a dry run 414. For example, the space reserved for data may be dirty space. The dirty space was unallocated space at the time of the reservation but will be reclaimed prior to writing the data. In addition, the block may contain several units of data that will be relocated prior to the reclamation process. With availability of sufficient free space, storing the data in the free space can be more efficient in terms of time involved to perform the write and in terms of life cycles of the memory cells in the physical blocks of the dirty space and free space. In the present embodiments, storing the data in the nonvolatile memory 420 can comprise storing the data with a background operation 422. Storing the data with a background operation 422 can free the media management system to perform alternative operations while the data is being written to the nonvolatile memory. For example, the media management system can receive an instruction to update data for a software application. The media management system may maintain data for the software application on a hard drive and in the nonvolatile memory. The media management system can initiate execution of the task by the reservation system. The reservation system can respond to the request with a reservation confirmation when sufficient unallocated space is available. The media management system is then free to initiate a foreground operation for a write instruction to the hard drive while initiating a background operation for the data write.

In the present embodiments, tracking a unit header boundary 430 can comprise storing a representation of the boundary, such as an offset, for each logical block and may save the time involved to determine the amount of unallocated space within a block by eliminating the need to find the unit header boundary prior to each reservation. This embodiment can allow changing the unit header boundary to increase the number of available headers. When the unit header boundary is tracked, determining the amount of unallocated granules may comprise determining the number of granules between the header data having the lowest offset and the unit header boundary offset and adding the number of dirty granules.

Referring still to FIG. 4, tracking a unit of memory comprising dirty space 440; and tracking an unallocated header, an unallocated granule, and an unallocated replacement granule 450 can provide additional efficiencies but may increase memory requirements. Tracking a unit of memory comprising dirty space 440 may associate a number of dirty granules with a logical block and can facilitate a determination to reclaim the block or to search for additional unallocated space when writing data having a reservation corresponding to the dirty space. A media manger may be designed to increase the life cycles of the nonvolatile memory by selecting blocks for reclamation having the most dirty space only when necessary to write data. Regardless of how the determination is made, the reclamation process can be performed as a background operation prior to the write. If valid data exists in the block to be reclaimed, the data may be copied to another block before the reclamation process begins. Tracking an unallocated header, an unallocated granule, and an unallocated replacement granule 450 may comprise storing offsets to a header, granule, and replacement granule for each logical block and can reduce, for instance, the time involved with finding a granule during writes to that block.

In some embodiments, receiving data to be stored in a nonvolatile memory 400 can comprise receiving an instruction involving a data write to nonvolatile memory along with a reference to the number of granules or bytes of data to be written. In such embodiments, the reservation system may return a reservation reference to the requesting agent, allowing the agent to maintain the data and the reservation reference. Many of these embodiments expect the agent to re-request the reservation if power is lost prior to writing the data to the nonvolatile memory. In alternative embodiments wherein the reservation system rather than the requesting agent maintains the data and associated reservation reference, the reservation system may notify the requesting agent upon reserving space and writing the data. Thus, when the requesting agent does not receive a confirmation for the data write, the requesting agent will re-request the data write.

In some embodiments, modifying a prior space reservation does not involve modifying a prior space reservation in a dry run 414. These embodiments may trade off some efficiency in performing writes for some efficiency in determining a reservation. In still further embodiments, reservations for data writes are stored in a buffer and associated with a logical block number in a logical block table. Several of these embodiments, prioritize data writes based upon a priority reference received from the media management system or from the requesting agent. In addition, many embodiments have a high priority that can allow a data write to be performed in a foreground operation.

Figure 5:
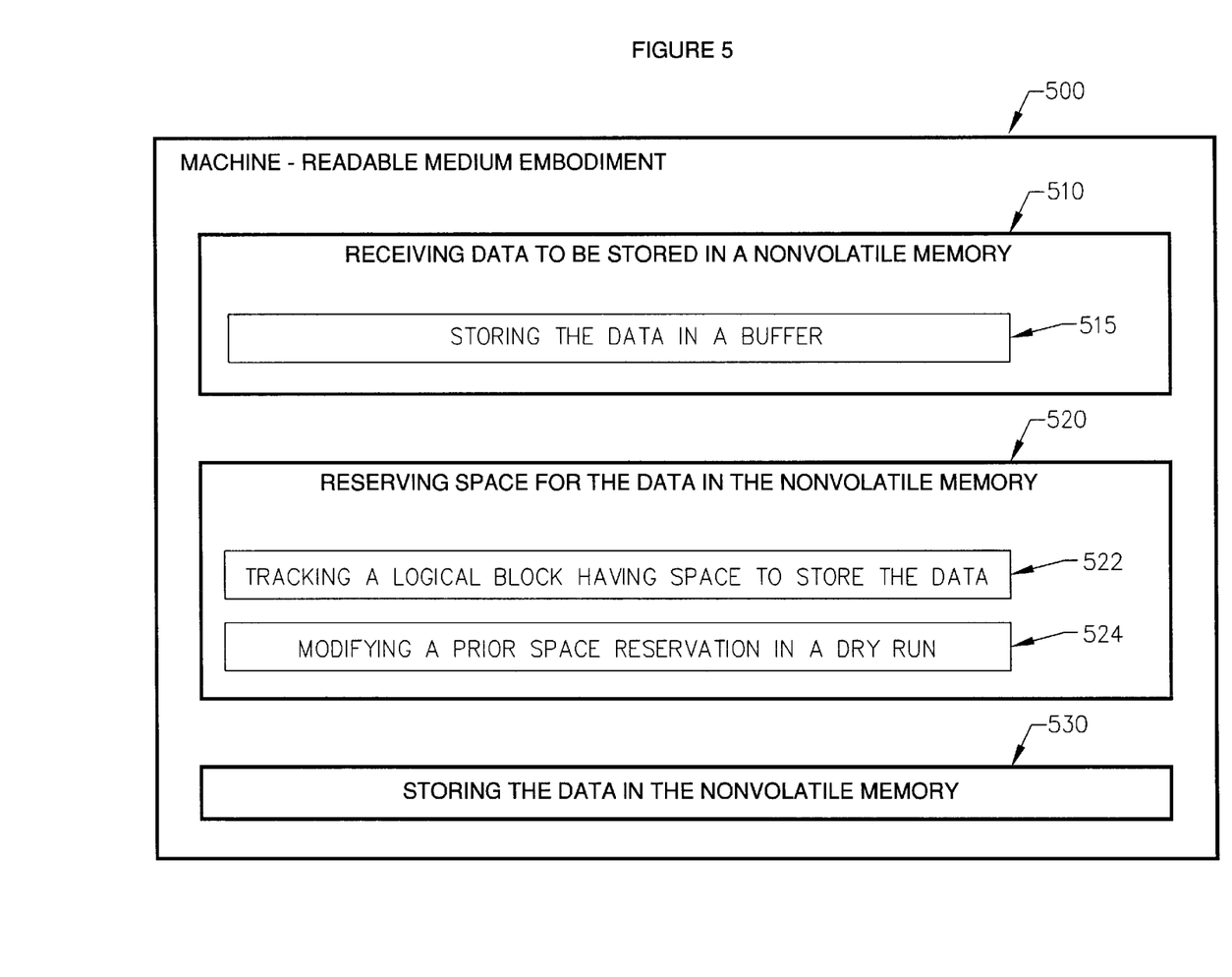
FIG. 5 depicts example machine-readable medium embodiments of the present invention.

Referring now to FIG. 5, a machine-readable medium embodiment of the present invention is shown. A machine-readable medium includes any mechanism that provides (i.e. stores and or transmits) information in a form readable by a machine (e.g., a computer), that when executed by the machine, can perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc . . . . Several embodiments of the present invention can comprise more than one machine-readable medium depending on the design of the machine.

The machine-readable medium embodiment 500 can comprise instructions for receiving data to be stored in a nonvolatile memory 510, reserving space for the data in the nonvolatile memory 520, and storing the data in the nonvolatile memory 530. Receiving data to be stored in a nonvolatile memory 510 can comprise storing the data in a buffer 515. Storing the data in a buffer 515 may transfer an instruction into a random access memory buffer while reserving space for a prior data write request. Storing the data in a buffer 515 can also store data to append to or replace data stored in the nonvolatile memory. Reserving space for the data in the nonvolatile memory 520 can provide a system to associate a reservation with data and track the reservation. Reserving space for the data in the nonvolatile memory 520 may comprise tracking a logical block having space to store the data 522 and modifying a prior space reservation in a dry run 524. Tracking a logical block having space to store the data 522 can comprise associating a buffer of reservations with a buffer comprising data to be written into nonvolatile memory or can comprise maintaining reservations in a buffer with the data to be written. Modifying a prior space reservation in a dry run 524 may alter prior data write reservations as well as rearrange the contents of a block without altering the contents of a physical block or its corresponding logical block. Modifying a prior space reservation in a dry ran 524 can be accomplished by copying contents of the logical block table into a buffer and modifying the copy of the logical block table. If the modification consolidates sufficient space to perform a data write, the modified contents of the copy of the logical block table can be copied into the logical block table buffer. On the other hand, if the modification fails to consolidate sufficient unallocated space for the data write, a new copy of the logical block table can be written over the modified copy, discarding the unsuccessful modification. This process can be repeated until a successful modification is found. Storing the data in the nonvolatile memory 530 may comprise writing data to a physical block associated with a reservation for the data. In some embodiments, a re-evaluation of the space reserved can be performed prior to the data write.

Some embodiments may further comprise tracking a unit header boundary and prioritizing data writes to perform writes in an order different from how they were reserved. For example, the nonvolatile memory manager may set data writes to be performed in a foreground operation when the data write is the high priority operation. In other embodiments, the media management system may tag a data write as a high priority to be performed in front of other lower priority data writes in a background operation for the nonvolatile memory manager.

What is claimed is:

1. A system, comprising:
   a media management system; and
   a nonvolatile memory manager coupled to said media management system and coupled to a nonvolatile memory;
   a first reservation tracker coupled to the nonvolatile memory manager to track unallocated nonvolatile memory space;
   a second reservation tracker to test changes in the unallocated nonvolatile memory space before implementing the changes.
2. The system of claim 1, further comprising an allocation system coupled to said nonvolatile memory manager.
3. The system of claim 1, further comprising a reclamation system coupled to said nonvolatile memory manager.
4. The system of claim 1, wherein said nonvolatile memory manager comprises a nonvolatile memory modifier to modify the contents of a memory cell in a background operation.
5. The system of claim 1, further comprising a buffer coupled to the second reservation tracker in which to test said changes.
6. An apparatus, comprising:
   a nonvolatile memory manager coupled to a nonvolatile memory;
   a table to store references to unallocated space;
   a reservation system coupled to said nonvolatile memory manager and the table and having a tracker to test requested changes to unallocated space in a copy of the table and to implement the changes in the table only if the test is successful.
7. The apparatus of claim 6, further comprising an allocation system coupled to said nonvolatile memory manager.
8. The apparatus of claim 7, wherein the allocation system comprises an unallocated granule tracker coupled to said nonvolatile memory manager.
9. The apparatus of claim 6, further comprising a reclamation system coupled to said nonvolatile memory manager.
10. The apparatus of claim 9, wherein the reclamation system comprises a dirty space tracker coupled to said nonvolatile memory manager.
11. The apparatus of claim 6, wherein said nonvolatile memory manager comprises a nonvolatile memory modifier to modify the contents of a memory cell in a background operation.
12. The apparatus of claim 6, further comprising a buffer couple to the tracker in which the requested changes are to be tested.
13. A method, comprising:
    receiving data to be stored in nonvolatile memory;
    copying a logical block table of unallocated space to a buffer;
    testing a first change in allocation of nonvolatile memory space to accommodate the data by modifying the table in the buffer;
    discarding the first change and repeating the copying and testing operations with a second change if said testing the first change is unsuccessful;
    reserving space for the data in the nonvolatile memory; and
    storing the data in the nonvolatile memory.
14. The method of claim 13, further comprising tracking a header boundary.
15. The method of claim 13, further comprising tracking a unit of memory comprising dirty space.
16. The method of claim 13, further comprising tracking an unallocated granule.
17. The method of claim 13, wherein said receiving data to be stored in a nonvolatile memory comprises:
    receiving a request to store data; and
    storing the data in a buffer.
18. The method of claim 13, wherein said reserving space for the data in the nonvolatile memory comprises tracking a logical block having space to store the data.
19. The method of claim 13, wherein said reserving space for the data in the nonvolatile memory comprises modifying a prior space reservation.
20. The method of claim 13, wherein said storing the data in the nonvolatile memory comprises storing the data with a background operation.
21. A machine-readable medium that provides instructions, which when executed by a machine, cause said machine to perform operations, comprising:
    receiving data to be stored in nonvolatile memory;
    copying a logical block table of unallocated space to a buffer;
    testing a first change in allocation of nonvolatile memory space to accommodate the data by modifying the table in the buffer;
    discarding the first change and repeating the copying and testing operations with a second change if said testing the first change is unsuccessful;

reserving space for the data in the nonvolatile memory; and storing the data in the nonvolatile memory.

22. The machine-readable medium of claim 21, further comprising tracking a unit header boundary.

23. The machine-readable medium of claim 21, further comprising tracking a unit of memory comprising dirty space.

24. The machine-readable medium of claim 21, further comprising tracking an unallocated granule.

25. The machine-readable medium of claim 21, wherein said receiving data to be stored in a nonvolatile memory comprises:

receiving a request to store data; and storing the data in a buffer.

26. The machine-readable medium of claim 21, wherein said reserving space for the data in the nonvolatile memory comprises tracking a logical block having space to store the data.

27. The machine-readable medium of claim 21, wherein said storing the data in the nonvolatile memory comprises storing the data with a background operation.

* * * * *